H. ETHERIDGE.
RIBBON FEED MECHANISM FOR TYPE WRITERS.
APPLICATION FILED JULY 28, 1914.
1,194,979.
Patented Aug. 15, 1916.
Fig. 1.
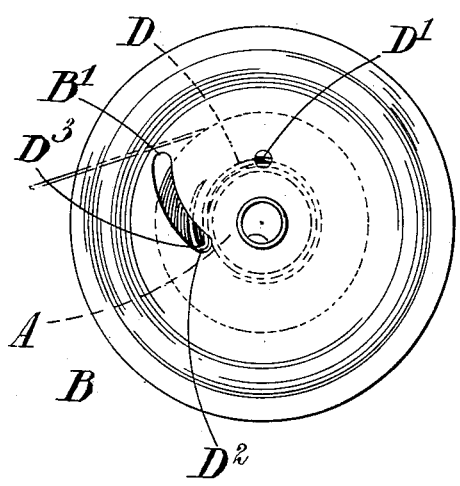
Fig. 2.
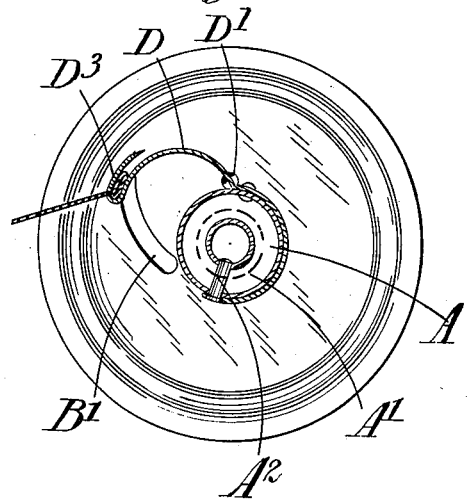
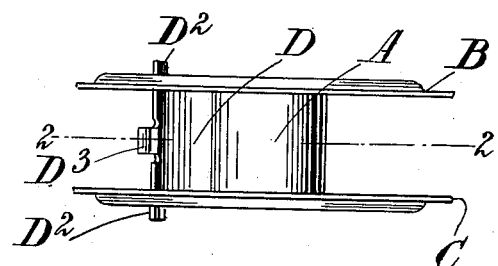
Fig. 3.
Witnesses
R. H. Balderson
A. W. M. Corwin
Inventor
H. Etheridge,
by Bakewell, Byrnes & Parmelee,
attys.

UNITED STATES PATENT OFFICE.

HERBERT ETHERIDGE, OF WIMBLEDON PARK, ENGLAND, ASSIGNOR TO THE BAR-LOCK TYPEWRITER COMPANY, LIMITED, OF LONDON, ENGLAND.

RIBBON-FEED MECHANISM FOR TYPE-WRITERS.

1,194,979.

Specification of Letters Patent.     Patented Aug. 15, 1916.

Application filed July 28, 1914. Serial No. 853,764.

*To all whom it may concern:*

Be it known that I, HERBERT ETHERIDGE, a subject of the King of England, residing at Wimbledon Park, Surrey, England, have invented certain new and useful Improvements in Ribbon-Feed Mechanism for Type-Writers, of which the following is a specification.

This invention is for improvements in or relating to ribbon-feed mechanism for typewriters and has for its object to provide improved mechanism whereby the direction of feed of the ribbon is automatically reversed when it has been unwound completely from one spool.

It has heretofore been proposed to move a lever to operate ribbon-feed reversing mechanism by a member projecting through one of the side flanges, pivoted on the spool and moved radially by the ribbon when it has been unwound, and no claim is made thereto.

The present invention comprises ribbon-feed reversing mechanism for a typewriter having a member pivoted on the spool as to be capable of radial movement thereon under the control of the ribbon, wherein the member projects beyond both flanges in the direction of the axis of the spool. These projecting portions may engage the lever or other device mounted on the machine adjacent to the spool and thereby control the clutch, ratchet or other mechanism whereby the spools are rotated; such mechanisms are well known, and form in themselves no part of the present invention.

The radially movable member which is pivotally mounted on the spool, is disposed with its pivotal axis parallel with but eccentric to the axis of the spool and it has ears which project through slots in both the flanges of the spool for the purpose above described. The member is pivoted close to one side of the hub of the spool and curved so as to lie against the hub in its inoperative position.

In the accompanying drawings—Figure 1 is a plan, Fig. 2 is a plan in section on the line 2—2 of Fig. 3, and Fig. 3 is an elevation of a ribbon-spool according to the present invention.

The ribbon-spool is of ordinary construction comprising a hub A with flanges B, C. The hub is provided with a central opening $A^1$ to receive the spindle by which it is driven for winding-on the ribbon; a rivet or bolt $A^2$ is arranged to project into the cavity $A^1$ to engage the spindle by a flat or key-way on it so as to provide operative connection between the two. An arm D for operating the ribbon-feed reversing mechanism is pivoted at one end $D^1$ close to the hub and curved to the same curvature as the hub, so that it can lie close against it when the ribbon is wound on the spool. The free end of the arm D is provided at $D^3$ with a hook for attaching the end of the ribbon to it, and there are also formed on it ears $D^2$ which project through slots $B^1$ in each of the flanges B and C; these slots, whereof one only is shown, are curved concentrically with the pivot point $D^1$ of the arm D.

The other details of the ribbon-feed reversing mechanism may be of any desired type which has an operating member situated adjacent to the spindle which receives the ribbon-spool. This member is arranged so that when the ears $D^2$ lie at the inner end of the slot $B^1$ they do not engage it, that is to say when the arm D lies close to the hub A with the ribbon wound on the spool. When the ribbon is fully unwound it causes the arm D to swing about its pivot $D^1$ so that the ears $D^2$ occupy a position farther from the center of the spool than they did; when in this position they engage with the above-mentioned member and cause the direction of the feed to be reversed. A spool may be placed on either spool-receiving spindle in a typewriter in two ways, *i. e.* there are four ways in which it may be placed on the machine. If the operating lever is actuated on only one side of the spool, three of these ways will be wrong; in two, the lever will not be operated, and in the third the direction of rotation will be wrong.

It will be appreciated that the present invention provides a simple and inexpensive construction of spool which can operate a reversing lever from either side of itself, that is to say the spool itself is symmetrical and it is not necessary to make any distinction between the two spools on any individual typewriter with respect to their coöperation with either mechanism; either spool, therefore, may be used indiscriminately on either of the two spindles provided therefor in a typewriter, and its placing on the typewriter is thereby facilitated since there are two "right" ways of placing it in position instead of only one as the two spools are interchangeable.

It will be understood that throughout this specification where the term "typewriter" is used any typing mechanism, such for example as is sometimes employed in an adding machine, is intended to be included.

It will be seen that the arm D is curved to lie flush against the hub of the spool and extends approximately half way around the same, the other half of the hub being occupied by the spring of the detent $A^2$, which spring is fixed at that end near the end $D^1$ of the arm D, and the arm and spring are of the same thickness so that together they present a flush exterior upon which the ribbon can be wound, instead of the arm presenting a step as would be the case if the spring of the detent $A^2$ were not in the position shown in the drawing.

Applicant is aware that interchangeable spools are not broadly new, but by combining a pivoted projection-carrying member, attached to the ribbon, for operating the reversible mechanism, with projections thereon passing through both flanges of the spool, and pivoting the said projection-carrying member close to the hub of the spool, a certainty of action and freedom from sticking is obtained, together with interchangeability and without making the projection-carrying member of such a design that its bulk or its shape cause it to be in the way of the ribbon or to increase the size of the spool.

What I claim as my invention and desire to secure by Letters Patent is:—

An interchangeable ribbon spool for typewriters, having a hub and a plurality of flanges, each flange having a curved slot therein, a ribbon reversing arm hinged at the hub of the spool and arranged to freely swing about an axis parallel with the axis of the hub, a hook on the end of said arm adapted to receive the end of the ribbon, and ears on said arm extending through the slots in the flanges, substantially as described.

In testimony whereof I have signed my name to this specification in the presence of two subscribing witnesses.

HERBERT ETHERIDGE.

Witnesses:
O. G. WORTH,
W. C. ROGERS.